United States Patent [19]

Boyd et al.

[11] Patent Number: 5,509,434
[45] Date of Patent: Apr. 23, 1996

[54] APPARATUS AND METHOD FOR CONTROLLING AND METERING THE FLOW OF GAS THROUGH A PIPELINE

[75] Inventors: Charles L. Boyd; Joseph A. Stewart, both of Duncan, Okla.

[73] Assignee: Halliburton Company, Houston, Tex.

[21] Appl. No.: 349,871

[22] Filed: Dec. 6, 1994

[51] Int. Cl.⁶ .................................................. G05D 7/06
[52] U.S. Cl. .......................... 137/8; 73/199; 73/861.94; 137/486; 137/487.5
[58] Field of Search .......................... 137/8, 486, 487.5; 73/199, 861.94

[56] References Cited

U.S. PATENT DOCUMENTS

| | | | |
|---|---|---|---|
| 3,174,504 | 3/1965 | Rosenbrock | 137/486 |
| 3,225,785 | 12/1965 | Goike | 137/486 |
| 3,369,561 | 2/1968 | Zimmerman | 137/486 |
| 5,152,309 | 10/1992 | Twerdochlib | 137/486 X |

OTHER PUBLICATIONS

Halliburton Services Special Products Division brochure on Frequency Converters dated Sep. 1991.
Halliburton Flow Measurement Systems brochure on Gas Turbine Flow Meter dated Oct. 1993.

*Primary Examiner*—Robert G. Nilson
*Attorney, Agent, or Firm*—William M. Imwalle; Paul R. Morico

[57] ABSTRACT

An apparatus and method for controlling and metering gas flowing through a pipeline is provided. The apparatus includes an orifice flow meter for accurately measuring the flow rate of gas through the pipeline within a certain range. The apparatus further includes a turbine flow meter which provides a measurement of the flow rate of the gas flowing through the pipeline over a broad range. A control circuit coupled to the turbine flow meter is provided for evaluating the flow rate to determine whether the flow rate is higher than a predetermined maximum value which can be recorded by the orifice flow meter or lower than a predetermined minimum value which can be recorded by the orifice flow meter. If the flow rate is higher than the predetermined maximum value, the control circuit generates a first voltage signal, if the flow rate is lower than the predetermined minimum value, the control circuit generates a second voltage signal. A frequency converter electrically coupled to the control circuit converts the voltage signals generated by the control circuit into an analog output current. A transducer electrically coupled to the frequency converter then converts the analog output current into a pneumatic signal which is communicated to a throttle valve pneumatically coupled to the transducer which partially closes in response to a pneumatic signal corresponding to the first voltage signal and which fully opens in response to a pneumatic signal corresponding to the second voltage signal.

18 Claims, 5 Drawing Sheets

APPARATUS AND METHOD FOR CONTROLLING AND METERING THE FLOW OF GAS THROUGH A PIPELINE

FIELD OF THE INVENTION

This invention relates generally to an apparatus and method for measuring gas flow and, more particularly, to an apparatus and method for controlling and metering the flow of gas through a pipeline where surges in flow rate often occur.

BACKGROUND OF THE INVENTION

Currently available devices and methods for measuring gas flow where surges in flow rate occur are notoriously inaccurate. This is particularly true where these devices and methods are used in measuring the discharge of accumulators in gas lift wells. A gas lift well is a type of well that brings oil and natural gas to the surface by injecting a catalyst gas into the well. The catalyst gas forces "pockets" of the oil and natural gas to the surface. Because the "pockets" of natural gas and oil brought to the surface vary in size and pressure, the gas extracted from these pockets in the accumulator exit the accumulator at varying pressures and thus have varying flow rates. Conventional devices, typically orifice meters, which are quite accurate within a certain range, have extreme difficulty in measuring the flow rate of the gas when it exits the accumulator at high velocities.

A typical orifice meter measures gas flow rate by measuring differential pressures across an orifice plate disposed within the gas stream. These differential pressures are directly proportional to the flow rates and are recorded on a circle chart recorder. If the flow rate surges to a point where it creates a differential pressure greater than the value which the chart recorder can measure, the recorder "pegs out" and cannot record the higher differential pressure value. Flow rate that occurs above the maximum value, therefore, cannot be recorded.

Typical orifice meters are placed in the pipeline at a location where it is desired to measure the gas flow. These meters have a circular cross-section which is axially aligned with the axis of the pipeline. This circular cross-section is concentrically reduced along the bore of the pipe. An orifice plate is disposed within the circular cross-section along the bore. As the gas flows through the reduced cross-section of the meter, a pressure drop is created from the upstream side to the downstream side of the orifice plate. The flow rate is proportional to the square root of the pressure drop, but there are a number of coefficients that have to be taken in account in defining the exact relationship.

A potential drawback of these known orifice meters is that they are only accurate over about a 3:1 turndown, i.e., the devices are only accurate when the maximum flow rate is no more than 3 times the minimum flow rate. The orifice of these devices is generally sized to fall within this range and produce the differential pressure that will drive the chart recorder over its normal range. So long as flow rates are within this range, the typical orifice meter produces accurate readings. Accuracy is lost if the meter is called upon to operate outside these limits, regardless of whether the readings are recorded onto a chart or input into some other readout device.

The present invention is directed to overcoming or at least minimizing some of the problems mentioned above.

SUMMARY OF THE INVENTION

In accordance with one embodiment of the present invention, an apparatus and method for controlling and metering the flow of gas through a pipeline is provided. The apparatus includes an orifice flow meter, which is disposed in the pipeline and a control meter also disposed in the pipeline. The orifice flow meter is provided for making accurate measurements of the flow rate of gas through the pipeline within a certain measurable range. The control meter, which is preferably a turbine flow meter, is provided for making measurements of the flow rate over a much broader range to determine if the flow rate is outside the range which can be measured by the orifice meter.

The turbine flow meter includes a magnetic pickup element which senses the speed of the turbine blades and sends a frequency signal to a control circuit. The control circuit evaluates the flow rate to determine whether the flow rate is higher than a predetermined maximum value which can be recorded by the orifice flow meter or lower than a predetermined minimum value which can be recorded by the orifice flow meter. If the flow rate is higher than the predetermined maximum value, the control circuit generates a first voltage signal, if the flow rate is lower than the predetermined minimum value, the control circuit generates a second voltage signal.

A frequency converter electrically coupled to the control circuit converts the voltage signals generated by the control circuit into an output current. The output current feeds into an electro-pneumatic transducer. The transducer converts the output current into a pneumatic signal which is transmitted to a throttle valve positioned in the pipeline upstream of the orifice flow meter. When the flow rate is above the predetermined maximum valve which can be recorded, the transducer's signal activates the valve to throttle the flow rate down to a level which can be recorded by a chart recorder connected to the orifice flow meter. The throttle valve remains in this position until the velocity of the flow stream decreases and the frequency output of the pickup element is equal to or less than a low set point frequency corresponding to the predetermined minimum value. At this flow rate, an analog signal is sent to the electro-pneumatic transducer, producing a signal to open the throttle valve so that the maximum flow rate within the chart recorder limits is attainable. If the flow rate should drop below a preset value, which is preferably less than the minimum flow rate which can be recorded when the valve is fully open, a pressure override switch activates the throttle valve to fully close. The throttle valve remains fully closed until the pressure in the pipeline reaches a preset trip point at which point the pressure override switch instructs the throttle valve to reopen causing the gas to flow once again. When the flow rate again drives the chart recorder off scale, the throttle valve is again instructed to partially close or fully open thereby reducing or increasing, respectively, the gas flow rate.

BRIEF DESCRIPTION OF THE DRAWINGS

The foregoing and other features of the present invention will be best appreciated with reference to the detailed description of the invention, which follows when read in conjunction with the accompanying drawings, wherein.

DETAILED DESCRIPTION

Figure 1:
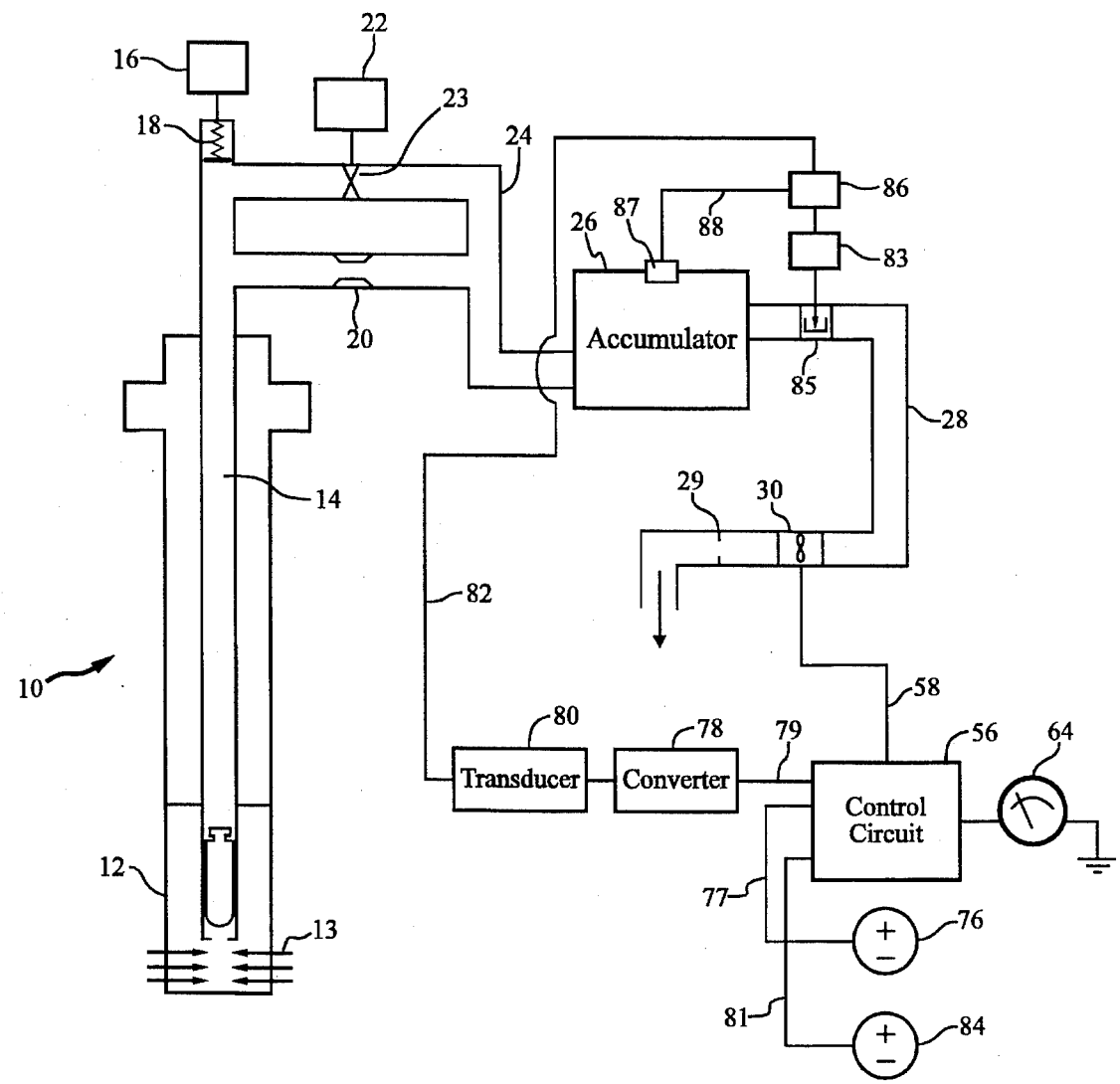
FIG. 1 is a schematic diagram showing an apparatus according to the present invention used in measuring and controlling gas flow exiting an accumulator in a gas lift well.

Turning now to the drawings and referring initially to FIG. 1, a gas lift well 10 is shown. The gas lift well 10 includes a cased well 12 and a tube 14 which fits into the cased well 12. Natural gas and oil flows under the pressure of a catalyst gas into the cased well 12, as depicted by the arrows 13. The gas flows from the cased well 12 up through the tube 14 to a well head 16. The well head 16 preferably includes a safety pressure relief valve 18 which releases excess pressure from the well 10. The gas lift well 10 also includes a choke 20, a shutoff valve control 22 and a shutoff valve 23 which is controlled by the shutoff valve control 22. The choke 20 controls the flow of the gas and oil exiting the well 10. When the choke 20 and the shut off valve 23 are closed the flow of the gas and oil out of the well 10 is completely cut off. The gas and oil exiting the choke 20 passes through a line 24 to an accumulator 26. The accumulator 26 separates the natural gas from the oil. Once separated from the oil, the natural gas exits the accumulator 26 flowing through a discharge line 28 which connects to a main pipeline (not shown) to deliver the gas to customers. The amount of gas flowing through discharge line 28 is measured by an orifice flow meter 29 installed therein. The orifice flow meter 29 is of the type conventionally used to measure the flow rate of gas through the discharge line 28. It forms no part of this invention and is, therefore, not described further herein.

A turbine flow meter 30, also disposed in the discharge line 28, is further provided for measuring the amount of gas flowing through the discharge line. The turbine flow meter 30 has a much greater range than the orifice flow meter 29 over which it can measure the flow of gas through the discharge line 28. The turbine flow meter 30 is, therefore, provided as a gage for determining when the flow rate is too great to be measured by the orifice flow meter 29. It is used in a gas flow rate control system which is provided for maintaining the flow rate of the gas through the discharge line 28 within a range which can be measured by the orifice flow meter 29.

Figure 2:
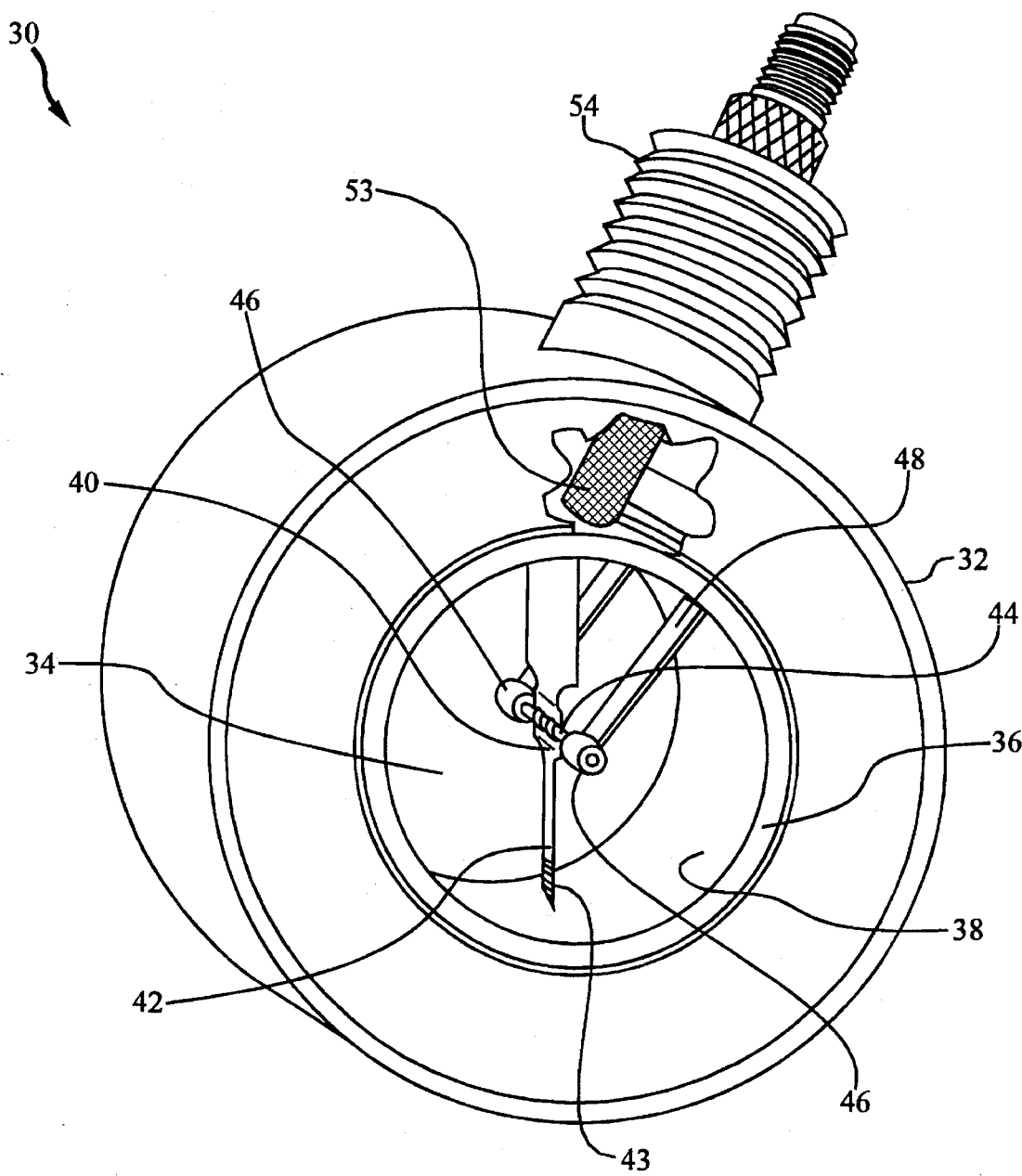
FIG. 2 is a perspective view of a turbine flow meter according to the present invention.

The turbine flow meter 30 includes a housing 32 having an opening 34 and a removable cartridge 36, as shown in FIG. 2. The housing 32 is designed for mounting in the discharge line 28 and is preferably formed of a grade 316L stainless steel. The removable cartridge 36 is disposed within the housing 32 and is preferably formed of a grade 316L stainless steel. The removable cartridge 36 can be removed from the housing 32 and can be easily replaced with a new one when its internal pans wear out. This avoids replacing the entire turbine orifice meter 30 when only its internal components need replacement.

The removable cartridge 36 has a generally tubular shape defining an inner cylindrical surface 38. A free spinning turbine 40 is disposed axially within the inner cylindrical surface 38. The free spinning turbine 40 preferably includes two or more rotor blades 42 formed of a grade 455 stainless steel or other corrosion resistant magnetic material. The rotor blades 42 are mounted to a shaft 44 formed of a tungsten carbide. The two blade design has the advantage of offering large unobstructed flow area. Foreign objects can therefore flow through the opening 34 without damaging the blades 42.

The shaft 44 is mounted in bearing mounts 46 preferably formed of a grade 304 stainless steel. The bearing mounts 46 have bearings (not shown) preferably formed of tungsten carbide. The tungsten carbide bearings eliminate the need for lubrication and can withstand difficult service conditions. They also contribute to the low inertia characteristics of the free spinning turbine 40 which enables the turbine flow meter 30 to respond to quick flow rate changes. A connecting member 48, preferably formed of stainless steel, connects the bearing mounts 46 to the inner cylindrical surface 38 of the removable cartridge 36 and, thus, provides a means for mounting the free spinning turbine 40 to the inner cylindrical surface 38.

Figure 3:
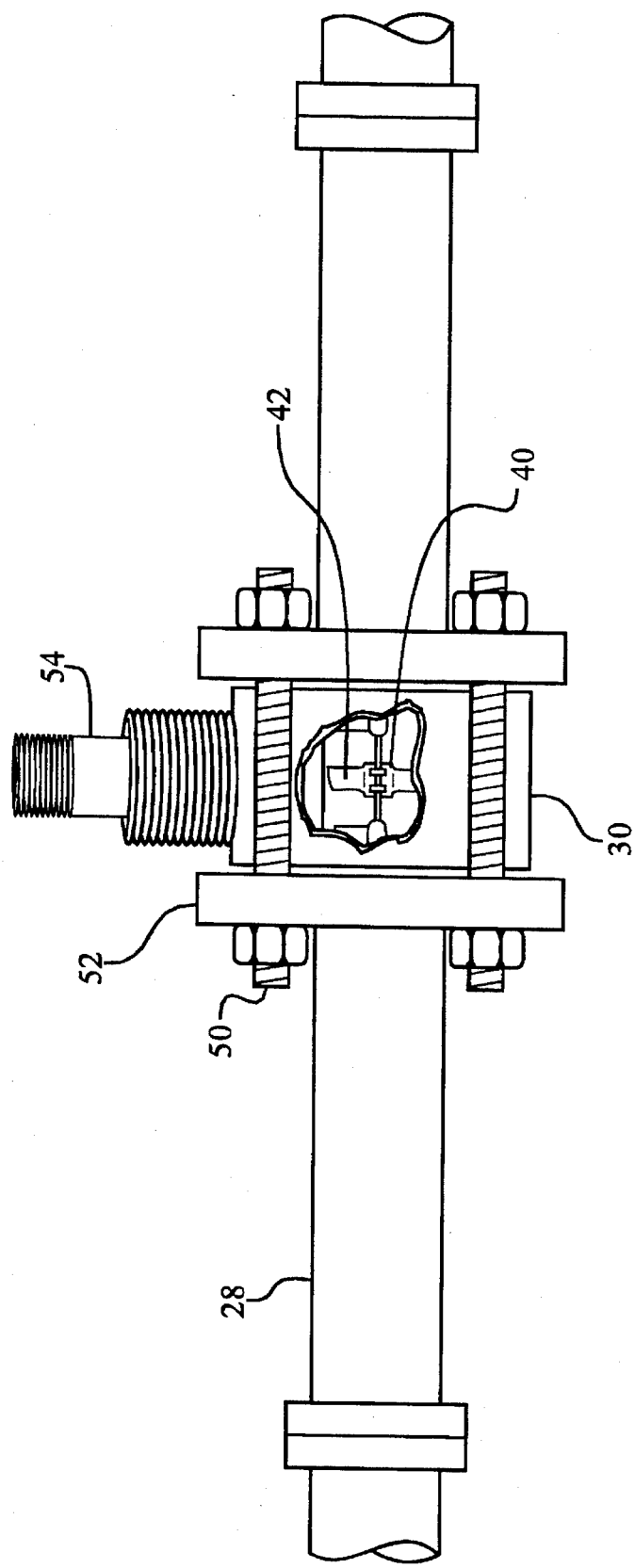
FIG. 3 is an illustration of the turbine flow meter shown in FIG. 2 mounted in the discharge line exiting the accumulator.

FIG. 3 shows the turbine flow meter 30 mounted in the discharge line 28 in a manner well known in the art. Through bolts 50 and centering rings 52, preferably formed of stainless steel, are used to secure the orifice flow meter 30 to the discharge line 28. The through bolts 50 make for easy removal of the turbine flow meter 30 when replacement of the cartridge 36 becomes necessary. The turbine flow meter 30 is preferably hermetically sealed to the discharge line 28 with copper seals (not shown).

As gas flows through the turbine flow meter 30 it causes the free spinning turbine 40 to rotate. A magnetic pickup element 53 (shown in FIG. 2) is coupled to the turbine flow meter 30 through a coupling 54. The coupling 54 is attached to the housing 32 and extends outwardly. The magnetic pickup element 53 senses the speed of the rotor blades 42 as the magnetic blades pass the magnetic pickup element 53. The speed of the rotor blades 42 is linearly proportional to the flow rate of the gas flowing through the turbine flow meter 30. The magnetic pickup element 53 communicates the flow rate in the form of a frequency signal to a control circuit 56 along a communication line 58 shown in FIG. 1. The communication line 58 connects at one end to the coupling 54 and at the other end to the control circuit 56.

Figure 4:
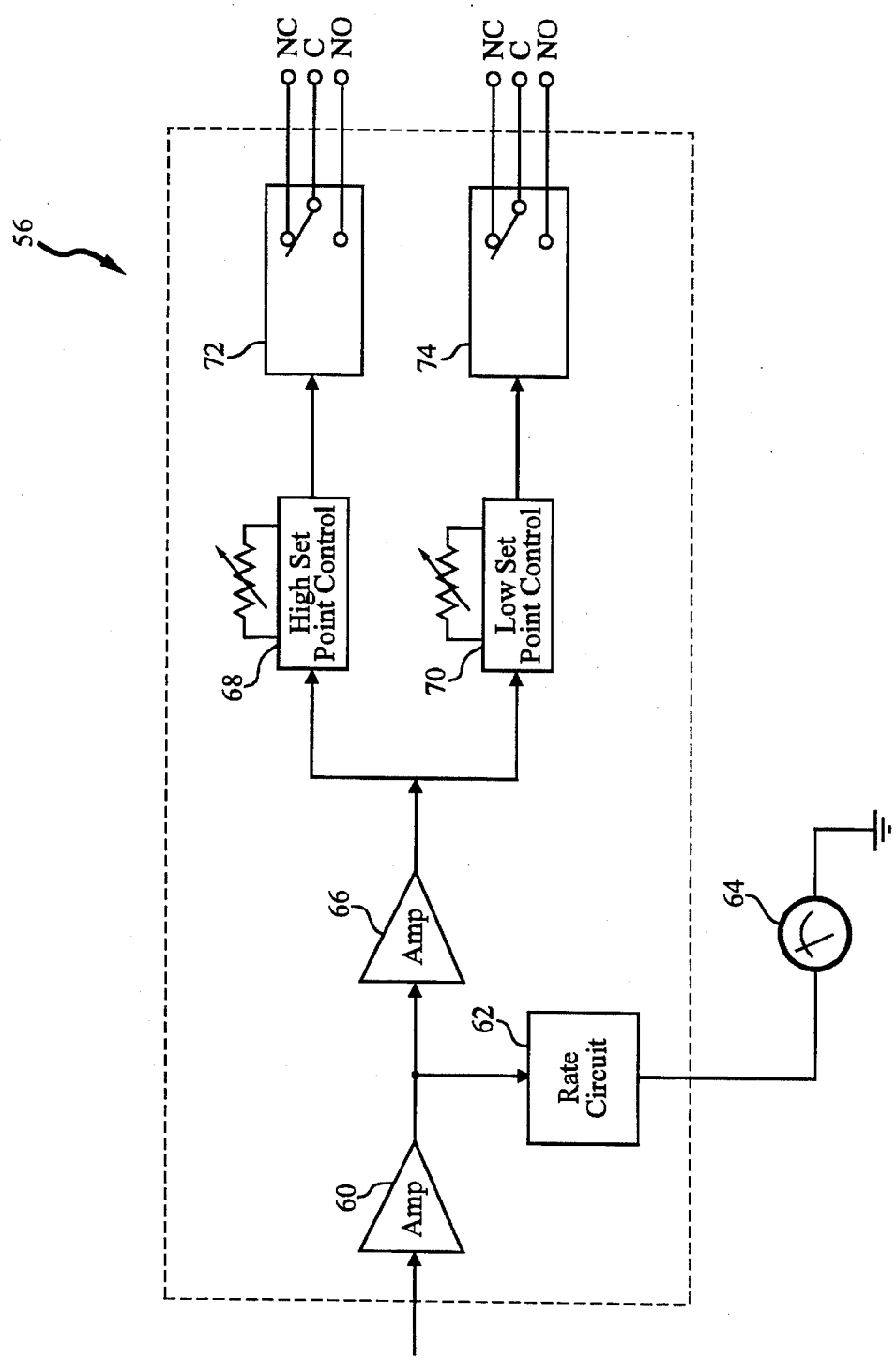
FIG. 4 is a diagram of a control circuit used in connection with the turbine flow meter according to the present invention.

FIG. 4 shows a schematic diagram of the control circuit 56. The frequency signal received from the magnetic pickup element 53 is sent to an amplifier 60. The amplifier 60 amplifies and squares the signal so that it can be subsequently processed. The amplifier 60 preferably has a gain that raises the amplitude of the signal to 12 volts. The amplified frequency signal is sent to a rate circuit 62 known in the art which processes the signal for display 64.

The amplified frequency signal is also sent to a second amplifier 66. The further amplified signal is then sent to a high set point control 68 and a low set point control 70. If the frequency of the signal exiting the amplifier 66 is above a maximum frequency (high set point) corresponding to a flow rate equal to or greater than the maximum rated range that can be measured with accuracy by the orifice flow meter 29, the high set point control 68 closes a high set point relay contact 72. A fixed voltage, that is preferably field adjustable, from a voltage source 76 (shown in FIG. 1) is then switched across the relay contact 72 and input into a frequency converter 78 via lines 77 and 79. The frequency converter 78 generates an analog current preferably between 4–20 mA (milliamps) proportional to the input voltage. A frequency converter such as Model HFC manufactured by Halliburton Services Special Products Division can be used. This current is transmitted to an electro-pneumatic transducer 80 which converts the current into a pneumatic signal. The pneumatic signal is proportional to the analog voltage signal and input frequency corresponding to the gas velocity. The source of gas for the pneumatic signal is preferably obtained from the discharge line 28.

The pneumatic signal is sent via communication line 82 to a pneumatic throttle valve control 83 (shown in FIG. 1), which controls the position of a pneumatic throttle valve 85. The pneumatic throttle valve 85 is located upstream of the flow meter 30 and downstream of the accumulator 26. In this instance, the pneumatic signal instructs the throttle valve control 83 to partially close the valve 85. When the valve 85 is partially closed the gas flow through the discharge line 28 is restricted and thereby reduced, preferably to a rate which can be accurately measured by the orifice flow meter 29. The valve 85 is held in this position until the flow rate begins to drop due to the bleeding off of the producing pressure.

However, if the frequency of the signal exiting the amplifier 66 is below a minimum frequency (low set point) corresponding to a flow rate equal to or less than the minimum rated range that can be measured with accuracy by the orifice flow meter 29, the low set point control 70 closes a low set point relay contact 74. A fixed voltage, that is preferably field adjustable, from a voltage source 84 (shown in FIG. 1) is then switched across the relay contact 74 and input into the frequency converter 78 via lines 81 and 79. The frequency converter 78 generates an analog current proportional to the input voltage. This current is transmitted to the electro-pneumatic transducer 80 which converts the current into a pneumatic signal that is proportional to the analog voltage signal and input frequency corresponding to the gas velocity. The pneumatic signal in this case instructs the pneumatic throttle valve controller 83 to fully open the pneumatic throttle valve 85. When the valve 85 is in the fully open position, the gas flow through the discharge line 28 is unrestricted and hence increases preferably to a rate above the minimum rated range that can be recorded on the chart recorder 64.

A pressure override switch 86 (shown in FIG. 1) is connected to the turbine flow meter 30 via the communication line 82 and to a sensor 87 in the accumulator 26 via communication line 88. The pressure override switch 86 may alternatively be connected directly to the orifice meter 30, to the control circuit 56, or to the frequency converter 78 depending upon which form of the signal it is equipped to receive and process. The pressure override switch 86 instructs the throttle valve control 83 to fully close the valve 85 when the flow rate falls below a preset limit (which is lower than the low set point). When the valve 85 is fully closed, gas flow through the discharge line 28 is completely shut off. The valve 85 remains fully closed until the pressure in the accumulator 26 builds and exceeds a preset trip point (which corresponds to a pressure sufficient to maintain a flow rate in the discharge line 28 which is equal to or above the low set point). The pressure override switch 86 is informed by the sensor 87 via communication line 88 when the pressure exceeds the preset trip point. The pressure override switch 86 then instructs the pneumatic throttle valve control 83 to fully reopen the valve 85 so that the gas can again begin to flow through the discharge line 28.

Figure 5:
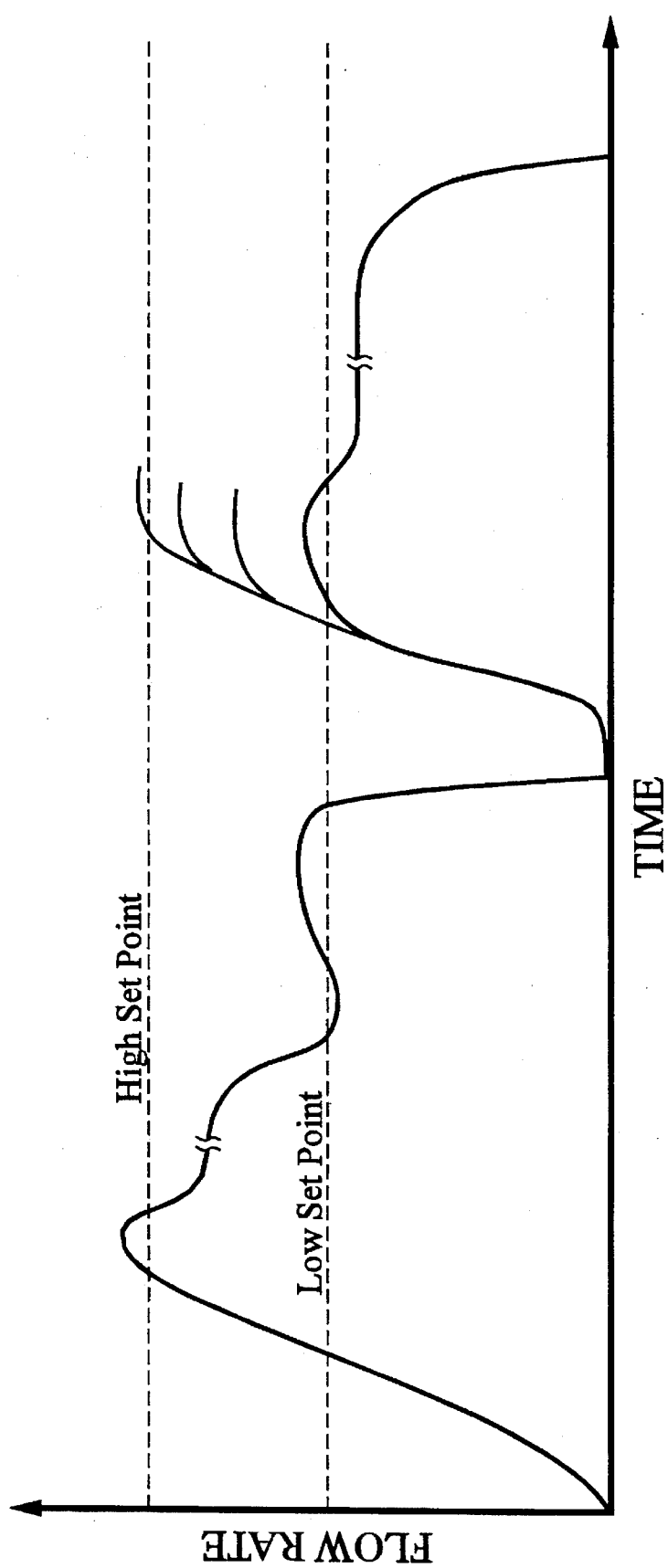
FIG. 5 is a graphic illustration of a gas flow cycle of the gas exiting the accumulator of the gas lift well shown in FIG. 1.

FIG. 5 shows a possible flow cycle for gas flowing through the discharge line 28. As shown in FIG. 5, as the gas flow rate in the discharge line 28 exceeds the preset high set point value, the control circuit 56 sends a signal to partially close the throttle valve 85. Then, only as the flow rate dips below the low set point value will the throttle valve 85 fully open, and, as can be seen, this typically causes the flow rate to increase. As the flow rate again dips, this time below the low set point when the throttle valve 85 is fully open, the pressure override switch instructs the throttle valve control 85 to fully close the throttle valve 85 stopping the flow altogether. The throttle valve 85 reopens only when sufficient pressure builds up in the line as sensed by the sensor 87. The flow rate may then return to within the range which can be measured with accuracy by the orifice flow meter 29, or it may be outside that range, in which case the throttle valve 85 must again be opened or closed, as illustrated by the various alternate plots shown to the right of the graph in FIG. 5.

Although a preferred embodiment of this invention has been described hereinabove in some detail, it will be appreciated that a variety of embodiments will be readily available to a person designing such flow controllers for a specific end use. The description of this invention is not intended to be limiting on this invention, but is merely illustrative of a preferred embodiment of this invention. Other devices, components, and methods which incorporate modifications or changes to that which has been described herein are equally included if within the scope of the appended claims.

What is claimed is:

1. An apparatus for controlling and metering gas flowing through a pipeline, comprising:

a control meter for measuring the flow rate of the gas flowing through the pipeline;

a control circuit coupled to the control meter, the control circuit evaluating the flow rate to determine whether the flow rate is higher than a predetermined maximum value or lower than a predetermined minimum value, if the flow rate is higher than the predetermined maximum value the control circuit generates a first voltage signal, if the flow rate is lower than the predetermined minimum value the control circuit generates a second voltage signal;

a frequency converter electrically coupled to the control circuit which converts the first voltage signal into a first analog output current, and which converts the second voltage signal into a second analog output current;

a transducer electrically coupled to the frequency converter which converts the first analog output current into a first pneumatic signal and which converts the second analog output current into a second pneumatic signal; and a throttle valve pneumatically coupled to the transducer and disposed in the pipeline upstream from the meter, the throttle valve partially closing in response to the first pneumatic signal thereby decreasing the flow rate of the gas through the pipeline and the throttle valve opening in response to the second pneumatic signal thereby increasing the flow rate of the gas through the pipeline.

2. The apparatus according to claim 1, further comprising an orifice flow meter for accurately measuring the flow rate of the gas flowing through the pipeline between the predetermined minimum value and the predetermined maximum value.

3. The apparatus according to claim 1, wherein the control meter includes a turbine flow meter having a housing and a removable cartridge disposed therein, the removable cartridge having a tubular shape defining an inner cylindrical surface.

4. The apparatus according to claim 3, wherein the turbine flow meter further comprises a free spinning turbine, the turbine being mounted to the inner cylindrical surface of the cartridge, the turbine having two rotor blades which rotate within the cartridge, each blade being made of a magnetic material and a magnetic pickup element coupled to the housing which measures the flow rate as the magnetic rotor blades pass by the magnetic pickup element.

5. The apparatus according to claim 1, further comprising a first voltage source and a second voltage source and wherein the control circuit comprises an amplifier which amplifies a frequency signal received from the turbine flow meter, a high set point control, a high set point relay contact which is activated by the high set point control if the gas flow rate is higher than the predetermined maximum value, a low set point control, and a low set point relay contact which is activated by the low set point control if the gas flow rate is lower than the predetermined minimum value, the first voltage source being connected to the control circuit when the high set point relay contact is activated sending a first voltage signal to the frequency converter and the second voltage source being connected to the control circuit when the low set point relay contact is activated sending a second voltage to the frequency converter.

6. The apparatus according to claim 1, wherein the frequency converter has an output of between 4 and 20 milliamps and generates an analog current proportional to the gas flow rate.

7. The apparatus according to claim 1, wherein the gas from the pipeline is used to generate the pneumatic signal.

8. The apparatus according to claim 1, further comprising a pressure override switch connected to the throttle valve, the turbine flow meter and an accumulator in the pipeline which fully closes the throttle valve when the flow rate falls below the predetermined minimum value when the throttle valve is fully open.

9. The apparatus according to claim 1, further comprising a chart recorder connected to the control circuit which displays the flow rate of the gas.

10. A method for controlling and metering the flow rate of gas through a pipeline, comprising the steps of:

measuring the flow rate of the gas at a predetermined location in the pipeline;

evaluating the flow rate to determine whether the flow rate is higher than a predetermined minimum value; communicating the flow rate to a control circuit;

transmitting a first voltage signal from the control circuit to a frequency converter if the flow rate is higher than the predetermined maximum value and transmitting a second voltage signal from the control circuit to the frequency converter if the flow rate is lower than the predetermined minimum partially closing a throttle valve disposed in the pipeline upstream of the predetermined location if the flow rate is higher than the predetermined maximum value thereby reducing the flow rate; and opening the throttle valve if the flow rate is lower than the predetermined minimum value thereby increasing the flow rate.

11. The method according to claim 10, further comprising the step of completely closing the throttle valve thereby completely shutting off the flow of gas if the flow rate drops below the predetermined minimum rate when the throttle valve is fully open.

12. The method according to claim 10, further comprising the step of displaying the flow rate.

13. The method according to claim 10, further comprising the steps of converting the voltage signal transmitted from the control circuit into an analog output current and transmitting this output current to an electro-pneumatic transducer.

14. The method according to claim 13, further comprising the steps of converting the analog output current transmitted from the frequency converter into a pneumatic signal and transmitting the pneumatic signal to the throttle valve.

15. An apparatus for controlling and metering the flow of gas through a pipeline, comprising:

means for measuring the flow rate of the gas at a predetermined location the pipeline;

means for communicating the flow rate to a control circuit;

means for evaluating the flow rate to determine whether the flow rate is higher than a predetermined maximum value or lower than a predetermined minimum value;

means for transmitting a first voltage signal from the control circuit to a frequency converter if the flow rate is higher than the predetermined maximum value and means for transmitting a second voltage signal from the control circuit to the frequency converter if the flow rate is lower than the predetermined minimum value;

means for partially closing a throttle valve disposed in the pipeline upstream of the predetermined location if the flow rate is higher than the predetermined maximum value thereby reducing the flow rate; and means for opening the throttle valve if the flow rate is lower than the predetermined minimum value thereby increasing the flow rate.

16. The apparatus according to claim 15, further comprising means for completely closing the throttle valve if the flow rate is lower than the predetermined minimum value when the throttle valve is open.

17. The apparatus according to claim 15, further comprising means for displaying the flow rate, the display means being connected to the measuring means.

18. The apparatus according to claim 15, wherein the measuring means includes a free spinning turbine meter.

* * * * *